United States Patent [19]

Harvey

[11] 4,184,585
[45] Jan. 22, 1980

[54] ENDLESS BAND CONVEYORS

[75] Inventor: George A. Harvey, Blakedown, England

[73] Assignee: U.M.E.C.-Boydell (Belting) Limited, Worcestershire, England

[21] Appl. No.: 825,049

[22] Filed: Aug. 16, 1977

[30] Foreign Application Priority Data

Aug. 17, 1976 [GB] United Kingdom ............... 34102/76
Nov. 24, 1976 [GB] United Kingdom ............... 48935/76

[51] Int. Cl.² ............................................ B65G 17/36
[52] U.S. Cl. .................................... 198/707; 198/714
[58] Field of Search .............. 198/706, 707, 712, 713, 198/714, 848, 849, 850, 851, 853

[56] References Cited

U.S. PATENT DOCUMENTS

| 2,096,948 | 10/1937 | Waalkes | 198/707 |
| 2,165,283 | 7/1939 | MacChesney | 198/851 |
| 2,435,498 | 2/1948 | Hapman | 198/706 |
| 3,785,476 | 1/1974 | Poerink | 198/853 |
| 3,870,141 | 3/1975 | Lapeyre et al. | 198/853 |

FOREIGN PATENT DOCUMENTS

| 2320921 | 11/1974 | Fed. Rep. of Germany | 198/853 |
| 1286155 | 8/1972 | United Kingdom | 198/853 |

Primary Examiner—Jeffrey V. Nase
Attorney, Agent, or Firm—Scrivener, Parker, Scrivener & Clarke

[57] ABSTRACT

The load-bearing components of an endless conveyor band are of composite construction, each component comprising two or more moulded plastics modules assembled together. The modules may be attached together by releasable connections. Where there are three or more modules comprising two end modules and one or more intermediate modules connected between the end modules, the or each intermediate module may be removable for varying the length of the load-bearing component.

4 Claims, 4 Drawing Figures

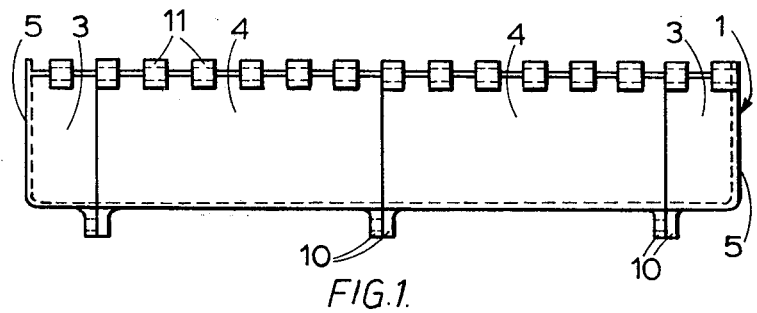
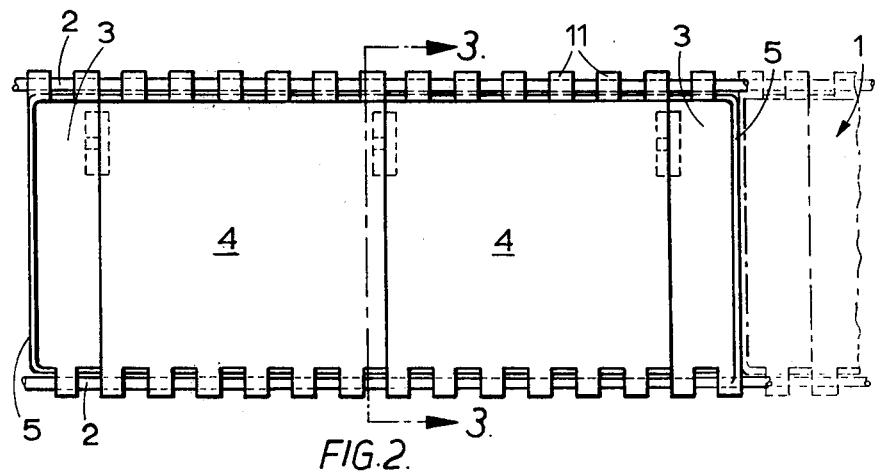
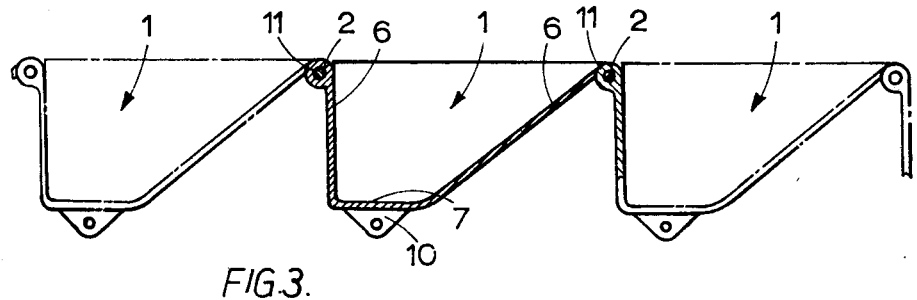
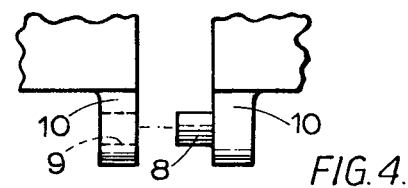

ENDLESS BAND CONVEYORS

This invention relates to endless band conveyors and more particularly to the bands of such conveyors of the kind constructed of load-bearing components of bucket form supported by spaced rod members which extend transversely of the direction of travel of the conveyor band. Such bands are hereinafter referred to as "of the kind described".

Hitherto load-bearing components of bucket form have been of a construction which has tended to limit the size of the components, and once made their sizes have been permanently fixed.

It is an object of the present invention to provide a load-bearing component of bucket form for an endless conveyor band of the kind described which is of composite construction comprising a plurality of moulded plastics modules assembled together, and the size and capacity of which can be varied by the addition or removal of one or more such modules.

A further object of the present invention is to provide an endless conveyor band of the kind described which has load-bearing components of bucket form which are of composite construction comprising a plurality of moulded plastics modules assembled together, the load carrying capacity of the conveyor band being variable by the addition of such modules to or there removal from the load-bearing components to alter the size of the components.

The modules may be arranged so that in a conveyor band the modules of adjacent composite components longitudinally of the conveyor band are in staggered relationship and mesh at the support rods. The staggered relationship and the meshing of the modules binds the components together. Accordingly the band will tend to remain intact and not add further complications to the breakdown if, for example, the conveyor band has driving chains connected to the support rods and the chains should break during use. The staggered relationship may be achieved by making the modules of the adjacent composite components of different lengths, that is to say the lengths of the modules of one of two adjacent components may be different from those of the modules of the other component. Alternatively, each component may comprise modules of at least two different lengths, adjacent components having modules of these different lengths but the modules being differently arranged in the components to produce the staggered relationship.

The or each composite component may comprise two end modules and one or more intermediate modules which are connected to the end modules. The end modules may be of substantially similar form to one another although if the components are to be, or are, arranged with the modules in the aforesaid staggered relationship in the conveyor band they may differ in length. Where there are two or more intermediate modules they may be of similar form to one another but possibly again of different lengths, or at least of two different lengths. Preferably the intermediate modules are adapted so that any desired number of them may be connected between the end modules and modules may be added or subtracted. Thus the component may be made in various lengths, and its length may be adjusted, if desired. With just two different forms of modules, or three if the end modules are required to be handed, a variety of sizes of components can be produced.

Thus the present invention enables the manufacture of conveyor bands to be more versatile than hitherto, and manufacture and construction can be simplified.

The end modules may be adapted for connection directly to one another, if necessary, without any intermediate modules.

Complementary male and female formations, such as pegs and slots, or tongues and grooves, may be provided on the modules for connecting them together.

Each module of the or each composite load-bearing component may have parts whereby it is hingedly connected to the supporting rod members of the band.

An embodiment of the invention will now be described by way of example with reference to the accompanying drawings in which, FIG. 1 is a side view of a composite load-bearing component of an endless conveyor band according to the present invention;

FIG. 2 is a plan view of the component;

FIG. 3 is a section on line 3—3 of FIG. 2, and

FIG. 4 is an enlarged detail view.

In this embodiment the conveyor band to which the invention is applied is for an elevator and has load-bearing components 1 of bucket form hinged to support-rods 2 which extend transversely of the band and are connected to drive chains, not shown.

As shown in the drawings, each load-bearing component 1 is an assembly of four interconnected modules, comprising two end modules 3 and two intermediate modules 4. All of the modules are moulded from plastics material, for example nylon. The two end modules 3 are of opposite hand to one another but otherwise are similar, each providing an end wall 5 of the complete load-bearing component and portions of opposite side walls 6 and a bottom wall 7 of the component. The intermediate modules 4 are identical to one another having portions which make up the remainder of the side and bottom walls of the component.

The modules are connected together by means of mating peg and hole formations, 8 and 9 respectively, FIG. 4, on and in depending lugs 10 on the bottom wall portions of the modules. The end modules each have one lug 10. The lug of one end module has a peg formation 8 and the lug of the other end module has a hole 9. Both of the intermediate modules have two lugs 10, the one having a peg formation 8 and the other having a hole 9. Corresponding lugs are at corresponding ends of the intermediate modules. The pegs are force fits in the holes and the friction retains the connections.

It will be appreciated from the arrangement of the lugs 10 that one of the intermediate modules 4 could be readily omitted and the remaining modules connected together, if a shorter load-bearing component is required. Both intermediate modules could even be omitted and the two end modules 3 connected directly one to the other. Alternatively for a longer component one or more additional intermediate modules could be connected into the assembly.

All the modules of the load-bearing component have integral, outwardly projecting, cylindrical eye portions 11 at the top edges of their opposite side wall portions. The eye portions 11 presented at the two sides of the component by the modules are co-axial. Those at one side are staggered with respect to the eye portions at the other side, so that the eye portions of successiv components in the conveyor band are able to mesh with one another. The support rods 2, which are metal, pass through the eye portions 11 and hingedly connect the components to the rods. The rods also serve to stiffen the assembled component.

Depending upon the materials to be carried by the band in use the inside surfaces of the load-bearing components may be smooth or roughened, for example by serrations. It is advantageous for the surfaces to be roughened when frozen foodstuffs, for example, are to be carried because it helps to prevent the foodstuff from sticking to the surfaces.

In the drawings the walls of the load-bearing components are all shown solid but some or all of them may be perforate if required.

In one particular practical example of the band described and illustrated the load-bearing components are 15" long, the end modules 3 of the components each being 1½" long and each intermediate module 4 being 6" long.

The load-bearing components may each extend across the full width of the band, or in some instances it may be preferable for two or more components to be disposed end-to-end across the width of the band, as indicated in FIG. 2.

The drive chains may be of conventional metal construction. They may alternatively be made at least in part of elements of plastics material such as nylon.

By virtue of the fact that both sides of the load-bearing components are hingedly connected to the support rods 2, a stronger and generally more satisfactory band construction is provided than the known constructions for elevators having load-bearing components of bucket form in which only one side of a component is hinged and the other side merely rests on the hinged side of the next adjacent component along the band.

It will be readily understood from the foregoing how, by arrangement of the modules, or changes in the lengths of the modules, of the composite components, a staggered relationship between the modules of components which are adjacent to one another longitudinally of the made-up conveyor band may be achieved, if desired.

I claim:

1. A load-bearing component for an endless conveyor band being of bucket form having two opposed end walls, two opposed side walls and a bottom wall, and comprising two moulded plastics end modules respectively formed to provide one of said end walls and portions of said side and bottom walls, and an intermediate moulded plastics module removably disposed between said end modules and formed to provide further portions of said side and bottom walls, said bottom wall portions of said end and intermediate modules having depending lugs at which are formed integrally therewith complementary connecting means comprising male and female formations constructed and arranged for force fit interengagement for releasably attaching said intermediate module to said end modules, said connecting means of said end modules enabling said end modules to be connected directly together when said intermediate module is removed, and said modules each having eye portions integral with said side wall portions, said eye portions at each said side wall being co-axial and being constructed and arranged for connecting the load-bearing component hingedly to a rod member of a conveyor band which supports the component in use.

2. A load-bearing component for an endless conveyor band being of bucket form having two opposed end walls, two opposed side walls and a bottom wall, and comprising two moulded plastics end modules respectively formed to provide one of said end walls and portions of said side and bottom walls, and a plurality of intermediate moulded plastics modules removably disposed between said end modules and formed to provide further portions of said side and bottom walls, said bottom wall portions of said end and intermediate modules having depending lugs at which are formed integrally therewith complementary connecting means comprising male and female formations constructed and arranged for force fit interengagement for releasably attaching said intermediate modules to said end modules and together, said connecting means of all said modules enabling any of said intermediate modules to be removed and the remaining modules to be connected together, and said modules each having eye portions integral with said side wall portions, said eye portions of each said side wall being co-axial and being constructed and arranged for connecting the load-bearing component hingedly to a rod member of a conveyor band in use.

3. An endless conveyor band comprising spaced rod members which extend transversely of the conveyor band, and load-bearing components of bucket form supported by said rod members, each said bucket form load-bearing component having two opposed end walls, two opposed side walls and a bottom wall and comprising two moulded plastics end modules respectively formed to provide one of said end walls and portions of said side and bottom walls, and an intermediate moulded plastics module removably disposed between said end modules and formed to provide further portions of said side and bottom walls, said bottom wall portions of said end and intermediate modules having depending lugs at which are formed integrally therewith complementary connecting means comprising male and female formations constructed and arranged for force fit interengagment for releasably attaching said intermediate module to said end modules, said connecting means of said end modules enabling said end modules to be connected directly together when said intermediate module is removed, and said modules each having eye portions integral with said side wall portions, said eye portions at each said side wall being co-axial and having one of said rod members extending therethrough, thereby hingedly connecting said load-bearing component to said rod member.

4. An endless conveyor band comprising spaced rod members which extend transversely of the conveyor band, and load-bearing components of bucket form supported by said rod members, each said bucket form load-bearing component having two opposed side walls and a bottom wall and comprising two moulded plastics end modules respectively formed to provide one of said end walls and portions of said side and bottom walls, and a plurality of intermediate moulded plastics modules removably disposed between said end modules and formed to provide further portions of said side and bottom walls, said bottom wall portions of said end and intermediate modules having depending lugs at which are formed integrally therewith complementary connecting means comprising male and female formations constructed and arranged for force fit interengagment for releasably attaching said intermediate modules to said end modules and together, said connecting means of all said modules enabling any of said intermediate modules to be removed and the remaining modules to be connected together, and said modules each having eye portions integral with said side wall portions, said eye portions at each said side wall being co-axial and having one of said rod members extending therethrough, thereby hingedly connecting said load-bearing component to said rod member.

* * * * *